United States Patent
Linebarger et al.

(10) Patent No.: US 7,123,839 B1
(45) Date of Patent: Oct. 17, 2006

(54) SYSTEM AND METHOD FOR TRANSMITTING SIGNALS OVER A FIBER STRAND

(75) Inventors: John W. Linebarger, Overland Park, KS (US); Durga P. Satapathy, Olathe, KS (US); Michael J. Gettles, Merriam, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 653 days.

(21) Appl. No.: 09/784,517

(22) Filed: Feb. 15, 2001

(51) Int. Cl.
*H04B 10/00* (2006.01)

(52) U.S. Cl. .............................. 398/115; 398/91; 398/48

(58) Field of Classification Search ................ 398/115, 398/116, 49, 91, 48; 359/125; 455/555; 370/328
See application file for complete search history.

(56) References Cited

U.S. PATENT DOCUMENTS

| | | | | |
|---|---|---|---|---|
| 5,202,780 A | * | 4/1993 | Fussanger | 398/72 |
| 5,682,256 A | * | 10/1997 | Motley et al. | 398/115 |
| 6,104,513 A | * | 8/2000 | Bloom | 398/117 |
| 6,223,055 B1 | * | 4/2001 | Cyr | 455/555 |
| 6,477,154 B1 | * | 11/2002 | Cheong et al. | 370/328 |
| 6,519,062 B1 | * | 2/2003 | Yoo | 398/49 |
| 6,577,414 B1 | * | 6/2003 | Feldman et al. | 725/129 |
| 6,654,563 B1 | * | 11/2003 | Darcie et al. | 398/98 |
| 6,751,417 B1 | * | 6/2004 | Combs et al. | 398/71 |
| 2001/0030785 A1 | * | 10/2001 | Pangrac et al. | 359/125 |

* cited by examiner

Primary Examiner—David C. Payne

(57) ABSTRACT

A method for transmitting a communication signal comprises transmitting a data signal over a wavelength on a single fiber strand and transmitting a radio frequency signal over another wavelength on the same single fiber strand. A system for transmitting the data signal and the radio frequency signal over wavelengths in a single fiber strand include one or more nodes in which at least one node transmits the data signal over a wavelength on the single fiber strand and transmits the radio frequency signal over another wavelength on the same single fiber strand. Another node receives the data signal and the radio frequency signal over the wavelengths on the single fiber strand. A cross connect for connecting the data signal and the radio frequency signal includes a data matrix configured to cross connect the data signal and a radio frequency matrix configured to cross connect the radio frequency signal.

8 Claims, 3 Drawing Sheets

SYSTEM AND METHOD FOR TRANSMITTING SIGNALS OVER A FIBER STRAND

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of data signals and wireless signals transmitted over fiber optic cable.

BACKGROUND OF THE INVENTION

Fiber optic cable is in wide use to carry communication signals. The fiber optic cable enables increased capacity and other benefits over prior transmission mediums. Each fiber optic cable contains multiple individual fiber strands, each of which can carry communication signals.

Individual optical wavelengths within each fiber strand can be used to carry individual communication signals. These individual optical wavelengths, sometimes referred to herein as lambdas, are used to provide a unique path for a communication signal over a fiber strand.

Many methods are used to increase capacity or to segregate traffic on the fiber strands. For example, dense wave division multiplex (DWDM) systems are used for such purposes. However, existing infrastructures and new infrastructures are not being used to fully take advantage of bandwidth availability of fiber optic cable. Thus, a new system and method are needed to use existing infrastructures and new infrastructures so that different types of communication signals can be transported over a single fiber strand.

SUMMARY OF THE INVENTION

The present invention is directed to a method for transmitting signals. The method comprises transmitting a data signal over a first wavelength on a single fiber strand and transmitting a radio frequency signal over a second wavelength on the same single fiber strand.

The present invention further is directed to a method for transmitting signals. The method comprises transmitting a plurality of data signals, each over a corresponding wavelength on a single fiber strand and transmitting a plurality of radio frequency signals, each over other corresponding wavelengths on the same single fiber strand.

Further, the present invention is directed to a system for transmitting signals. The system comprises a first node configured to transmit a data signal over a first wavelength on a single fiber strand and a radio frequency signal over a second wavelength on the same single fiber strand. The system further comprises a second node configured to receive the data signal over the first wavelength and the radio frequency signal over the second wavelength.

The present invention also is directed to an apparatus for transmitting signals. The apparatus comprises a device configured to transmit a data signal over a first wavelength on a single fiber strand and a radio frequency signal over a second wavelength on the same single fiber strand.

In addition, the present invention is directed to a system for transmitting signals. The system comprises a data signal matrix configured to transmit a data signal over a first wavelength on a single fiber strand. The system further comprises a radio frequency matrix configured to transmit a radio frequency signal over a second wavelength on the same single fiber strand.

DETAILED DESCRIPTION

Figure 1:
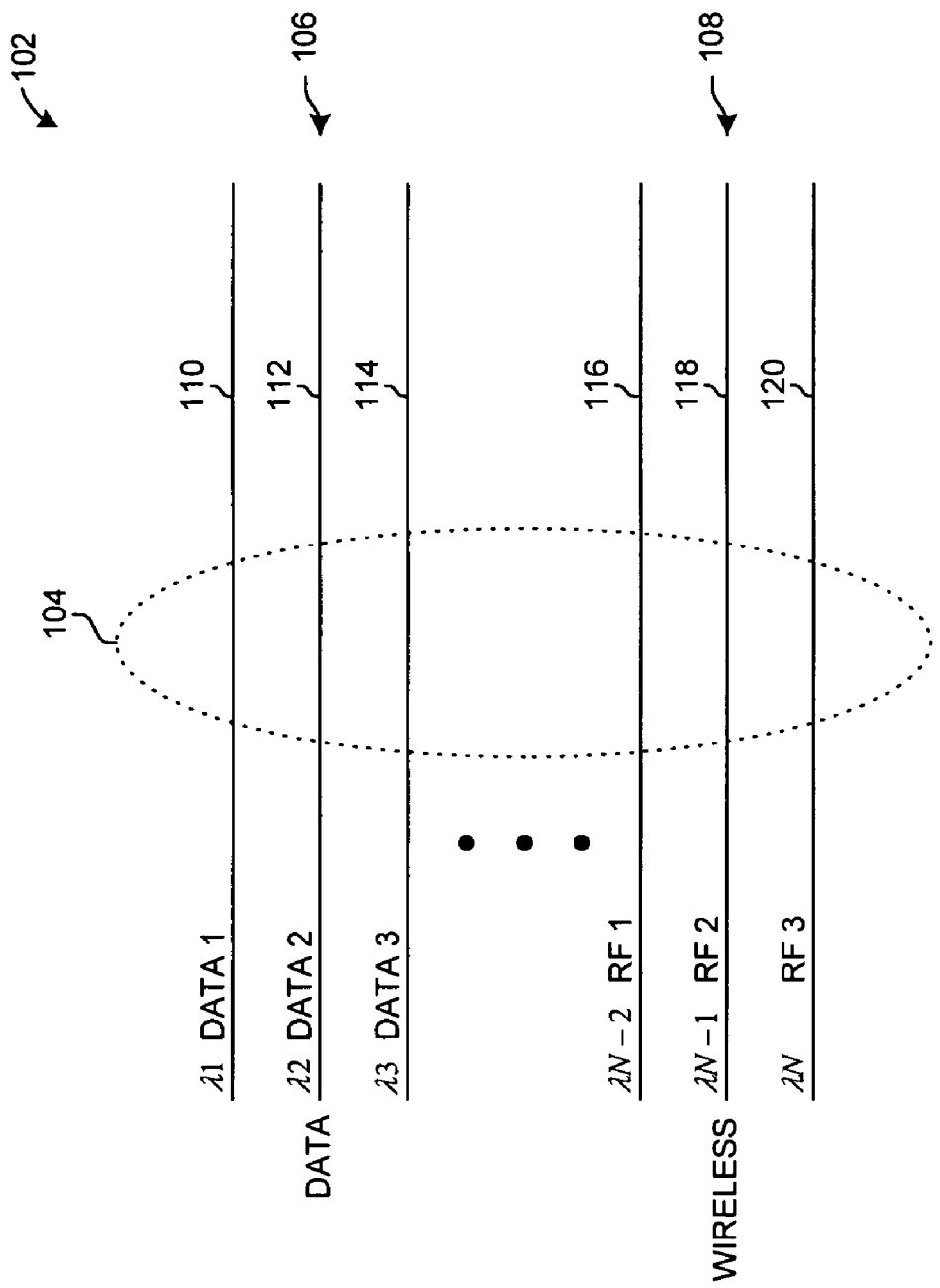
FIG. 1 is a diagram of a fiber strand with a mixed optical profile in accordance with an embodiment of the present invention.

Communication networks include worldwide networks, nationwide networks, and local networks. A wide infrastructure of fiber optic cable currently is being used in these networks, and additional fiber optic cable will be used in these and other networks in the future.

Two main signal types currently are being transported over fiber optic cable. Data signal companies and telecommunication companies typically only transport data signals and/or telephony ("data signals") from point to point. Data signals include signals from a synchronous optical network (SONET) device or other synchronous devices, an ethernet device, an asynchronous device, an optical carrier, or other devices. Other companies, such as cable television companies, typically only transport radio frequency (RF) and/or other wireless ("RF") signals. RF signals may include signals from wireless communications service (WCS) devices, personal communications service (PCS) devices, cellular devices, Multipoint multichannel distribution service (MMDS) devices, local multipoint distribution system (LMDS) devices, unlicensed bands devices, and others.

Many of these companies use a variety of methods to increase capacity or to segregate traffic. For example, dense wave division multiplex (DWDM) systems use individual optical wavelengths, otherwise known as lambdas, to provide a unique path over a fiber strand. However, current and new systems do not adequately and effectively use infrastructures for transporting signals over fiber strands because these systems transport only data signals or only RF signals.

The system and method of the present invention mixes multiple types of signals, such as RF signals and data signals, for transport over a single fiber strand, rather than using multiple separate fiber strands to carry multiple types of signals. This increases capacity and efficiencies for communication signal transportation and enables a single fiber to be used for multiple purposes.

In areas or networks where there is a limited amount of fiber optic cable, such as metropolitan areas, the system and method of the present invention can use existing infrastructures to carry both RF signals and data signals. For example, the method of the present invention can be used for backhaul. This reduces or eliminates the need to use separate fibers or separate cable to backhaul traffic, thereby saving costs on purchasing, installing, and maintaining additional fiber optic cable. The system and method of the present invention can be used with new infrastructures to gain the same increased capacity and efficiencies.

As used herein, the terms "signal" or "communication signal" mean a communication that may be received and/or transmitted. A signal may be a wireless signal or a wireline signal. A signal may have user communications, such as voice, data signal, or video, and/or call signaling or control messages, such as device instructions.

As used herein, the term "fiber optic cable" means one or more fiber strands over which signals can be transmitted optically. Fiber optic cable may or may not include multiple fibers, strength members, metallic conductors, and/or other protective cladding or outer jackets. In addition, there are other methods to manufacture fiber optic cable, and it may include other internal support structures.

FIG. 1 illustrates an exemplary embodiment of a transport system of the present invention. The transport system 102 and method of FIG. 1 comprises a fiber strand 104 having a first group 106 of wavelengths and a second group 108 of wavelengths.

Each group 106 and 108 of wavelengths has one or more wavelengths. For example, the first group 106 can have the wavelengths 110–114, and the second group 108 can have the wavelengths 116–120. There may be more or less than two groups of wavelengths, and each group may have more or less than the number of wavelengths depicted in the example of FIG. 1.

One group, such as the first group 106 of wavelengths, may be used for data signal services, such as SONET based signals over a first wavelength 110, ethernet based signals over a second wavelength 112, asynchronous type services over a third wavelength 114, and others. Examples of specific wavelengths for the first group 106 may include 1505 nanometers (nm), 1510 nm, and 1515 nm for the wavelengths 110–114, respectively. Another group, such as the second group 108 of wavelengths, may be used for RF signal services, such as PCS over an N-2 (fourth) wavelength 116, LMDS over an N-1 (fifth) wavelength 118, MMDS over an Nth (sixth) wavelength 120, and others. Examples of specific wavelengths for the second group 108 may include 1540 nm, 1560 nm, and 1580 nm for the wavelengths 116–120, respectively. As used herein, "N" may be any integer. It will be appreciated that other data signals or RF signals may be transported over these or other wavelengths.

Any device may be used to transport and receive the mixed optical profile over a fiber strand. For example, a fiber optic transmitter may be used to transmit the data signals and the RF signals over the fiber strand, a fiber optic receiver may be used to receive the data signals and the RF signals over the fiber strand, a cross connect device or other switching device may be used to connect or otherwise switch the data signals and the RF signals between wavelengths, fibers, fiber optic cables, or other paths, and other optical devices may be used.

Figure 2:
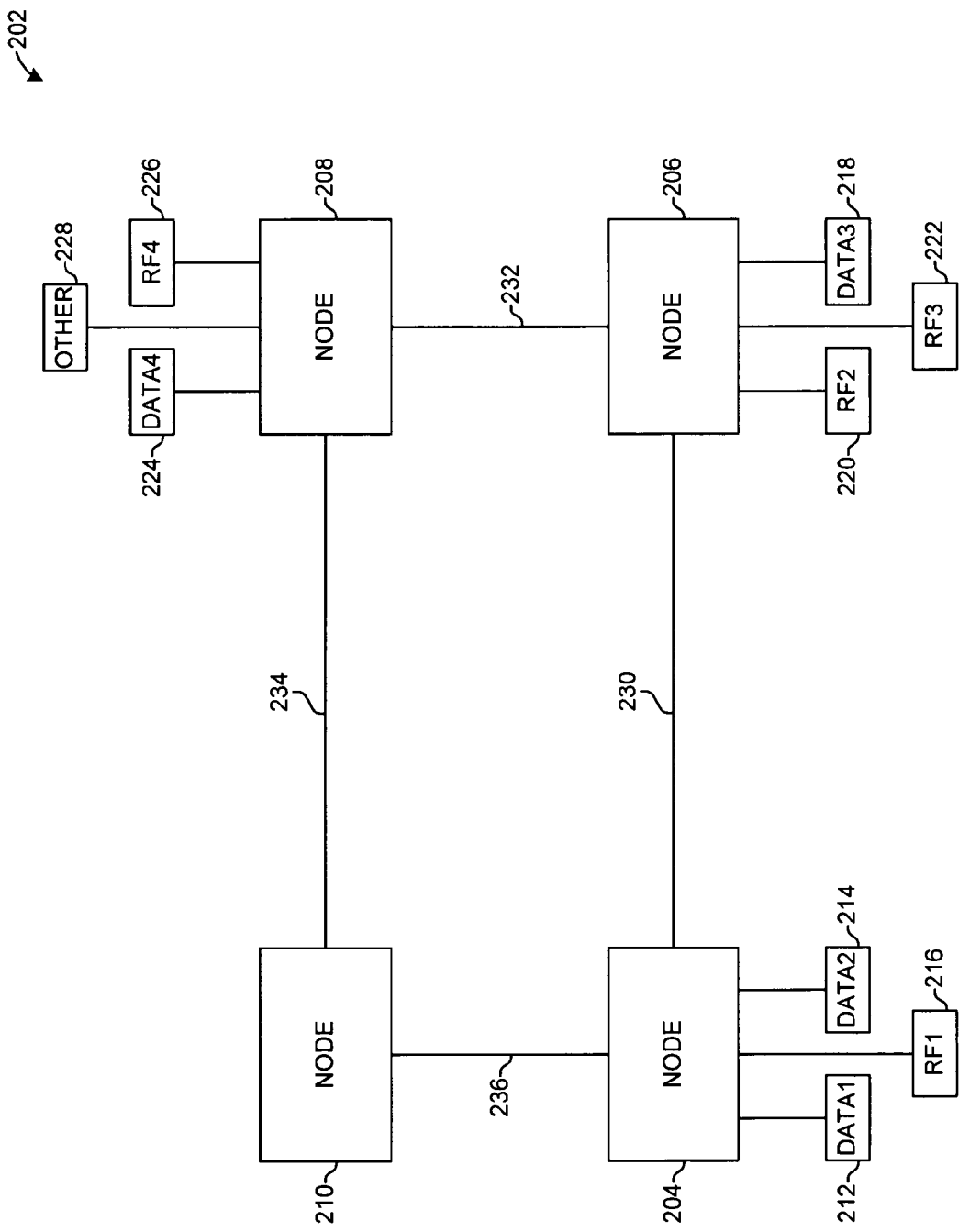
FIG. 2 is a block diagram of a communication system in accordance with an embodiment of the present invention.

FIG. 2 illustrates an exemplary embodiment of a communication system of the present invention. The communication system 202 transports data signals and RF signals over a single fiber strand. The communication system 202 comprises nodes 204–210 connected to a data signal device or an RF signal device.

The nodes 204–210 each are any device configured to transmit and/or receive a mixed optical profile, i.e. a mixed data signal and RF signal optical profile, over a single fiber strand. The nodes 204–210 each may comprise a switch; a cross connect, a fiber optic transmitter, a fiber optic receiver, and/or any other device configured to transmit and/or receive a mixed optical profile over a single fiber strand. The nodes 204–210 further may be a service node, a point of presence, or another node.

Each node 204–210 may be connected to a data device and/or an RF device over a data connection and/or an RF connection. Thus, for example, the node 204 can be connected to a first data device 212, a second data device 214, and a first RF device. The node 206 may be connected to a third data device 218, a second RF device 220, and a third RF device 222. In addition, the node 208 may be connected to a fourth data device 224, a fourth RF device 226, or another device 228.

In a first example, the first data device 212 is any data device, the second data device 214 is an optical carrier-48 (OC-48), and the first RF device 216 is a PCS device. In this example, the third data device 218 is an add drop multiplexer (ADM) transmitting data signals over an OC-192 to the node 206, and the third RF device is an MMDS device. Also in this example, the fourth data device 224 is a SONET device transmitting data signals over a SONET pipe to the node 208 and receiving data signals over the SONET pipe from the node, the fourth RF device 226 is any RF device transmitting RF signals to, or receiving RF signals from, the node 208, and the other device 228 is any communications device.

Figure 3:
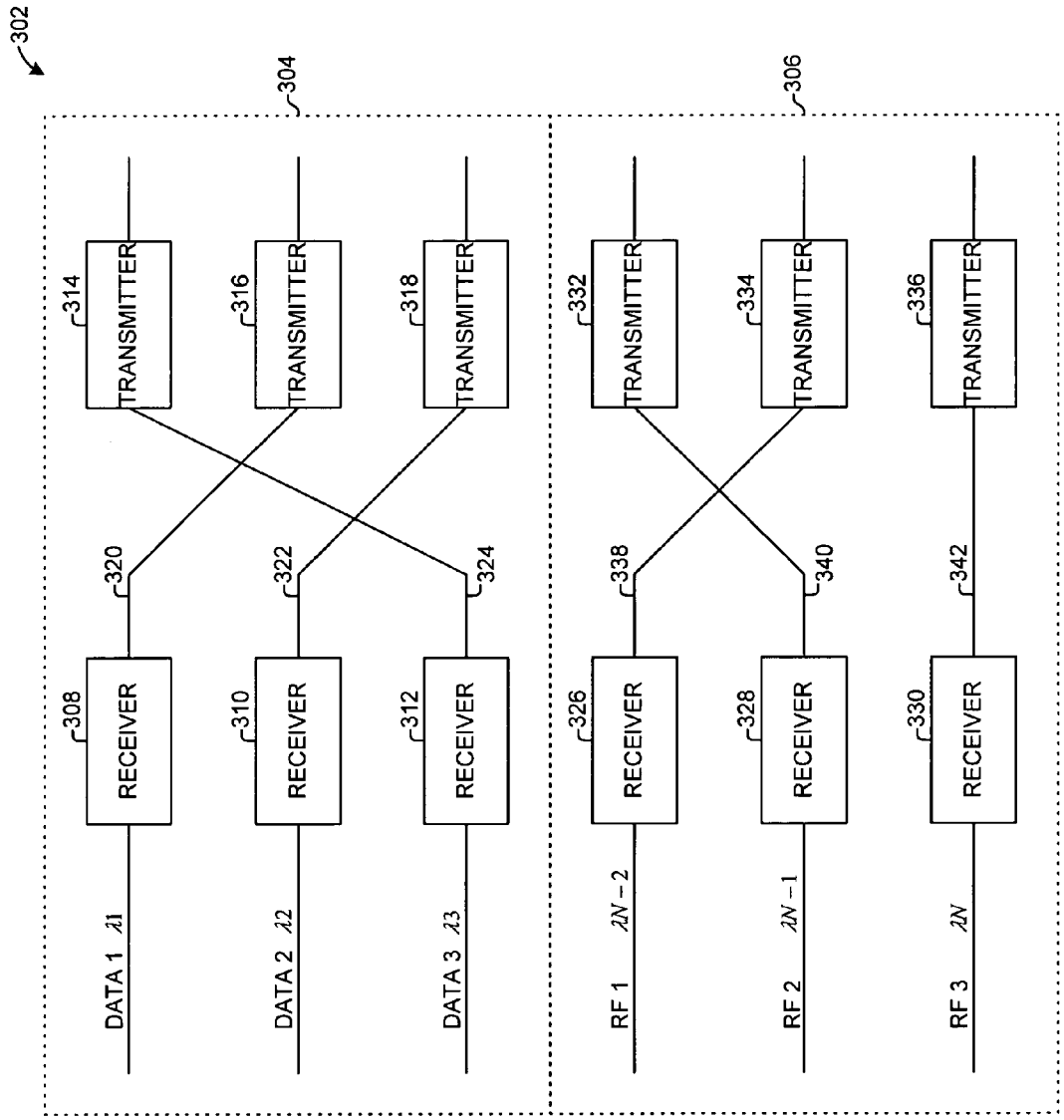
FIG. 3 is a block diagram of a cross connect system in accordance with an embodiment of the present invention.

FIG. 3 depicts an exemplary embodiment of a connection device configured to cross connect data signals and RF signals. The cross connect system 302 comprises a data matrix 304 and an RF matrix 306.

The data matrix 304 cross connects data signals over one or more wavelengths in a single fiber or over one or more fibers. The data matrix 304 can be pre-provisioned or provisioned in response to specific switching needs.

In the example of FIG. 3, the data matrix 304 comprises receivers 308–312 for each wavelength to be received and transmitters 314–318 for each wavelength to be transmitted from the cross connect system 302. Each of the receivers 308–312 receive data signals over a wavelength in an optical format, convert the data signals to an electrical format, and transmit the data signals to a transmitter 314–318 over a connection 320–324. The connections may be pre-provisioned or may be provisioned dynamically as needed. The transmitters 314–318 receive data signals from one of the receivers 308–312 and convert the data signals to an optical format. The transmitters 314–318 then transmit the data signals over a corresponding wavelength. It will be appreciated that greater or fewer receivers, transmitters, and connections may be used than shown in the example of FIG. 3.

The RF matrix 306 cross connects RF signals over one or more wavelengths in a single fiber or over one or more fibers. The RF matrix 306 can be pre-provisioned or provisioned in response to specific switching needs.

In the example of FIG. 3, the RF matrix 306 comprises receivers 326–330 for each wavelength to be received and transmitters 332–336 for each wavelength to be transmitted from the cross connect system 302. Each of the receivers 326–330 are configured to receive RF signals over a wavelength in an optical format, convert the RF signals to an electrical format, and transmit the RF signals to a transmitter 332–336 over a connection 338–342. The connections 338–342 may be jumpers that are pre-provisioned between the receivers 326–330 and the transmitters 332–336. However, other types of connections may be used, such as connections that are provisioned dynamically as needed. The transmitters 332–336 receive RF signals from one of the receivers 326–330 and convert the RF signals to an optical format. The transmitters 332–336 then transmit the RF signals over a corresponding wavelength. The transmitters 332–336 can be configured to use wave guide modulation to transmit the RF signals in the optical format. It will be appreciated that greater or fewer receivers, transmitters, and connections may be used than shown in the example of FIG. 3.

Those skilled in the art will appreciate that variations from the specific embodiments disclosed above are contemplated by the invention. The invention should not be restricted to the above embodiments, but should be measured by the following claims.

What is claimed is:

1. A system for transmitting signals comprising:
   a data matrix comprising:
      a plurality of first receivers, each of which is configured to receive one of a plurality of data signals over one of a first plurality of wavelengths on a first single optical fiber strand; and
      a plurality of first transmitters, each of which is configured to transmit one of the plurality of data signals over one of the first plurality of wavelengths on a second single optical fiber strand; and
      wherein each of the plurality of first receivers is connected with one of the plurality of first transmitters so that at least one of the data signals is transmitted over a different one of the first plurality of wavelengths than which it was received; and
   a radio frequency matrix comprising:
      a plurality of second receivers, each of which is configured to receive one of a plurality of radio frequency signals over one of a second plurality of wavelengths on the first single optical fiber strand; and
      a plurality of second transmitters, each of which is configured to transmit one of the plurality of radio frequency signals over one of the second plurality of wavelengths on the second single optical fiber strand;
      wherein each of the plurality of second receivers is connected with one of the plurality of second transmitters so that at least one of the radio frequency signals is transmitted over a different one of the second plurality of wavelengths than which it was received.

2. The system of claim 1 wherein the radio frequency matrix comprises a plurality of jumpers, wherein each of the plurality of jumpers is configured to connect one of the plurality of second receivers to one of the plurality of second transmitters.

3. The system of claim 1 wherein each of the plurality of first receivers is connected with one of the plurality of first transmitters on a pre-provisioned basis.

4. The system of claim 1 wherein each of the plurality of first receivers is connected with one of the plurality of first transmitters on a dynamically provisioned basis.

5. The system of claim 1 wherein each of the plurality of second receivers is connected with one of the plurality of second transmitters on a pre-provisioned basis.

6. The system of claim 1 wherein each of the plurality of second receivers is connected with one of the plurality of second transmitters on a dynamically provisioned basis.

7. The system of claim 1 wherein:
   each of the plurality of first receivers is configured to convert one of the plurality of data signals to an electrical format, and
   each of the plurality of first transmitters is configured to convert one of the plurality of data signals to an optical format.

8. The system of claim 1 wherein:
   each of the plurality of second receivers is configured to convert one of the plurality of radio frequency signals to an electrical format, and
   each of the plurality of first transmitters is configured to convert one of the plurality of radio frequency signals to an optical format.

* * * * *